(12) United States Patent
Olson et al.

(10) Patent No.: US 12,162,261 B2
(45) Date of Patent: Dec. 10, 2024

(54) COMPOSITE MATERIALS WITH MEMBRANE

(71) Applicant: The North Face Apparel Corp., Wilmington, DE (US)

(72) Inventors: Cory Michael Olson, Golden, CO (US); Vijanderan Somasundaram, Dublin, CA (US)

(73) Assignee: The North Face Apparel Corp., Wilmington, DE (US)

( * ) Notice: Subject to any disclaimer, the term of this patent is extended or adjusted under 35 U.S.C. 154(b) by 0 days.

(21) Appl. No.: 17/642,490

(22) PCT Filed: Sep. 11, 2020

(86) PCT No.: PCT/US2020/050367
§ 371 (c)(1),
(2) Date: Mar. 11, 2022

(87) PCT Pub. No.: WO2021/050849
PCT Pub. Date: Mar. 18, 2021

(65) Prior Publication Data
US 2022/0339914 A1 Oct. 27, 2022

Related U.S. Application Data

(60) Provisional application No. 62/900,001, filed on Sep. 13, 2019.

(51) Int. Cl.
| B32B 5/02 | (2006.01) |
|---|---|
| A41D 1/02 | (2006.01) |
| A41D 19/00 | (2006.01) |
| A41D 31/102 | (2019.01) |
| A41D 31/14 | (2019.01) |
| A43B 7/12 | (2006.01) |
| B32B 5/04 | (2006.01) |
| B32B 5/08 | (2006.01) |
| B32B 5/26 | (2006.01) |
| B32B 7/12 | (2006.01) |

(Continued)

(52) U.S. Cl.
CPC .................. *B32B 5/26* (2013.01); *A41D 1/02* (2013.01); *A41D 19/0006* (2013.01); *A41D 31/102* (2019.02); *A41D 31/14* (2019.02); *A43B 7/125* (2013.01); *B32B 5/02* (2013.01); *B32B 5/08* (2013.01); *B32B 7/12* (2013.01); *B32B 27/36* (2013.01); *A41D 1/00* (2013.01); *A41D 1/04* (2013.01); *A41D 1/06* (2013.01); *A41D 31/145* (2019.02); *A41D 31/18* (2019.02); *A41D 2500/10* (2013.01); *A41D 2500/20* (2013.01); *A41D 2500/30* (2013.01); *A42B 1/00* (2013.01); *A43B 23/022* (2013.01); *A43B 23/026* (2013.01); *A47G 9/086* (2013.01); *B32B 5/022* (2013.01); *B32B 5/024* (2013.01); *B32B 5/026* (2013.01); *B32B 5/04* (2013.01); *B32B 5/262* (2021.05); *B32B 5/265* (2021.05); *B32B 5/275* (2021.05); *B32B 5/279* (2021.05); *B32B 7/14* (2013.01); *B32B 27/02* (2013.01); *B32B 27/12* (2013.01); *B32B 27/34* (2013.01); *B32B 27/40* (2013.01); *B32B 2250/02* (2013.01); *B32B 2250/24* (2013.01); *B32B 2262/0261* (2013.01); *B32B 2262/0276* (2013.01); *B32B 2262/0292* (2013.01); *B32B 2262/14* (2013.01); *B32B 2262/148* (2021.05); *B32B 2262/152* (2021.05); *B32B 2307/51* (2013.01); *B32B 2307/554* (2013.01); *B32B 2307/712* (2013.01); *B32B 2307/718* (2013.01); *B32B 2307/724* (2013.01); *B32B 2307/7265* (2013.01); *B32B 2437/00* (2013.01); *B32B 2437/02* (2013.01); *B32B 2437/04* (2013.01); *D10B 2501/04* (2013.01); *D10B 2501/041* (2013.01); *D10B 2501/043* (2013.01); *D10B 2505/18* (2013.01); *E04H 15/54* (2013.01); *Y10T 428/24851* (2015.01); *Y10T 428/27* (2015.01); *Y10T 442/3008* (2015.04); *Y10T 442/3016* (2015.04); *Y10T 442/3024* (2015.04); *Y10T 442/3707* (2015.04); *Y10T 442/413* (2015.04); *Y10T 442/494* (2015.04)

(58) Field of Classification Search
None
See application file for complete search history.

(56) References Cited

U.S. PATENT DOCUMENTS 4,725,481 A * 2/1988 Ostapchenko ........ B32B 27/285
528/343
5,027,438 A 7/1991 Schwarze et al.
(Continued)

FOREIGN PATENT DOCUMENTS

CN 1662375 A 8/2005
CN 1940174 A * 4/2007
(Continued)

OTHER PUBLICATIONS

Machine Translation of JP-2010138496-A/JP-5315961-B2, Jun. 2010 (Year: 2010).*

(Continued)

*Primary Examiner* — Jeffrey A Vonch
(74) *Attorney, Agent, or Firm* — Smith, Gambrell & Russell LLP

(57) ABSTRACT

Composite materials are described herein. An example composite material may comprise a shell fiber layer. The example composite material may comprise a membrane disposed adjacent the shell fiber layer.

20 Claims, No Drawings

(51) Int. Cl.

| | |
|---|---|
| *B32B 27/36* | (2006.01) |
| *A41D 1/00* | (2018.01) |
| *A41D 1/04* | (2006.01) |
| *A41D 1/06* | (2006.01) |
| *A41D 31/18* | (2019.01) |
| *A42B 1/00* | (2021.01) |
| *A43B 23/02* | (2006.01) |
| *A47G 9/08* | (2006.01) |
| *B32B 7/14* | (2006.01) |
| *B32B 27/02* | (2006.01) |
| *B32B 27/12* | (2006.01) |
| *B32B 27/34* | (2006.01) |
| *B32B 27/40* | (2006.01) |
| *E04H 15/54* | (2006.01) |

(56) References Cited

U.S. PATENT DOCUMENTS

| | | | |
|---|---|---|---|
| 5,863,644 A * | 1/1999 | Bonigk | D02G 3/402 428/221 |
| 6,018,819 A * | 2/2000 | King | A41D 31/102 2/904 |
| 7,111,327 B1 * | 9/2006 | Blauer | A41D 3/04 2/97 |
| 10,595,570 B1 * | 3/2020 | Blakely | A41D 31/02 |
| 2001/0018096 A1 * | 8/2001 | Klare | B01D 71/36 428/319.3 |
| 2002/0173211 A1 * | 11/2002 | Kocinec | B32B 7/14 442/268 |
| 2004/0116028 A1 * | 6/2004 | Bryner | B32B 5/022 442/79 |
| 2005/0075028 A1 * | 4/2005 | Rock | B32B 27/34 442/244 |
| 2005/0124256 A1 | 6/2005 | Mason et al. | |
| 2005/0214501 A1 * | 9/2005 | Baychar | B32B 5/24 442/373 |
| 2006/0201874 A1 * | 9/2006 | Klare | C08J 5/2275 428/319.3 |
| 2007/0281567 A1 * | 12/2007 | Baychar | B32B 5/06 442/304 |
| 2008/0096001 A1 * | 4/2008 | Emden | D03D 15/292 428/222 |
| 2008/0104738 A1 * | 5/2008 | Conley | B32B 5/26 2/82 |
| 2008/0108263 A1 * | 5/2008 | Conley | D04H 1/728 442/76 |
| 2008/0134444 A1 * | 6/2008 | Greenspoon | D04B 1/00 8/115.56 |
| 2008/0182096 A1 | 7/2008 | Johnson et al. | |
| 2008/0220676 A1 * | 9/2008 | Marin | A41D 31/102 156/278 |
| 2009/0094727 A1 * | 4/2009 | Reynolds | A41B 17/00 2/87 |
| 2009/0176056 A1 * | 7/2009 | Marin | B32B 5/26 156/278 |
| 2009/0186548 A1 * | 7/2009 | Rock | A41D 31/102 156/244.11 |
| 2009/0220763 A1 * | 9/2009 | Hatfield | B32B 27/16 442/80 |
| 2010/0024136 A1 * | 2/2010 | Takenoiri | B32B 5/026 442/329 |
| 2010/0071115 A1 * | 3/2010 | Sadato | D06M 23/16 428/196 |
| 2010/0129629 A1 * | 5/2010 | Tee | B32B 27/14 156/60 |
| 2010/0183859 A1 * | 7/2010 | Dieudonne | C08L 21/02 524/37 |
| 2010/0255741 A1 * | 10/2010 | Tee | B32B 27/08 442/77 |
| 2010/0291825 A1 * | 11/2010 | Johnson | D06P 1/90 2/87 |
| 2010/0316819 A1 | 12/2010 | Bansal et al. | |
| 2011/0033687 A1 * | 2/2011 | Deguchi | D03D 15/283 442/164 |
| 2011/0041693 A1 * | 2/2011 | Hatfield | B32B 27/205 96/9 |
| 2011/0086208 A1 * | 4/2011 | Nemphos, Jr. | B32B 5/04 428/196 |
| 2011/0092122 A1 * | 4/2011 | Conley | A41D 31/102 977/961 |
| 2012/0291177 A1 * | 11/2012 | Luscher | A41D 31/185 2/69 |
| 2013/0017748 A1 * | 1/2013 | Na | D04H 1/728 442/365 |
| 2013/0294002 A1 * | 11/2013 | Thompson | B32B 5/026 361/212 |
| 2015/0282544 A1 * | 10/2015 | Lankes | D04H 13/00 428/113 |
| 2015/0360158 A1 * | 12/2015 | Menkhaus | B01J 20/28007 162/146 |
| 2016/0044980 A1 * | 2/2016 | Greenacre | A41D 1/06 2/243.1 |
| 2016/0168756 A1 * | 6/2016 | Gladish | D04H 3/03 428/221 |
| 2016/0353820 A1 * | 12/2016 | Baychar | B32B 5/06 |
| 2017/0208899 A1 | 7/2017 | Wadley et al. | |
| 2017/0266919 A1 * | 9/2017 | Seok | B32B 7/14 |
| 2019/0125018 A1 * | 5/2019 | Kurtzweg | B32B 5/026 |
| 2019/0194847 A1 * | 6/2019 | Schoots | D04H 1/56 |
| 2019/0308390 A1 * | 10/2019 | Bansal | B32B 37/0076 |

FOREIGN PATENT DOCUMENTS

| | | | | |
|---|---|---|---|---|
| CN | 101942723 A | * | 1/2011 | |
| CN | 102167902 A | * | 8/2011 | |
| CN | 203049169 U | * | 7/2013 | |
| CN | 103445362 A | * | 12/2013 | |
| CN | 103584387 A | * | 2/2014 | |
| CN | 104480639 A | * | 4/2015 | D01D 5/0007 |
| CN | 104532611 A | * | 4/2015 | |
| CN | 104762839 A | * | 7/2015 | |
| CN | 107263971 A | * | 10/2017 | A41D 31/02 |
| CN | 107524026 A | * | 12/2017 | |
| CN | 107696619 A | * | 2/2018 | |
| CN | 108842469 A | | 11/2018 | |
| CN | 109695082 A | * | 4/2019 | D02G 3/04 |
| EP | 1264684 A1 | * | 12/2002 | A41D 19/0006 |
| JP | 05005276 A | * | 1/1993 | |
| JP | 11061649 A | * | 3/1999 | |
| JP | 2000336544 A | * | 12/2000 | |
| JP | 2007-515313 A | | 6/2007 | |
| JP | 2007136970 A | * | 6/2007 | |
| JP | 2008036985 A | * | 2/2008 | |
| JP | 2008213391 A | * | 9/2008 | A41D 31/02 |
| JP | 2009256863 A | * | 11/2009 | |
| JP | 2010030289 A | * | 2/2010 | B32B 5/022 |
| JP | 2010-509509 A | | 3/2010 | |
| JP | 2010084252 A | * | 4/2010 | |
| JP | 2010138496 A | * | 6/2010 | |
| JP | 2011-511887 A | | 4/2011 | |
| JP | 3185179 U | | 8/2013 | |
| JP | 2013166340 A | * | 8/2013 | |
| JP | 2014100843 A | * | 6/2014 | |
| JP | 2018009268 A | * | 1/2018 | |
| KR | 20090079645 A | | 7/2009 | |
| KR | 2009127553 A | * | 12/2009 | |
| KR | 2010027338 A | * | 3/2010 | |
| KR | 2017019666 A | * | 2/2017 | D03D 11/00 |
| KR | 2018037784 A | * | 4/2018 | D01D 5/003 |
| NL | 2002036 C | * | 3/2010 | B32B 5/02 |
| TW | 201716229 A | | 5/2017 | |
| WO | WO-9303221 A1 | * | 2/1993 | D21F 1/0036 |
| WO | WO-2004050973 A1 | * | 6/2004 | D03D 15/00 |
| WO | WO-2008108393 A1 | * | 9/2008 | A41D 31/02 |
| WO | WO-2014095434 A1 | * | 6/2014 | B32B 27/12 |
| WO | WO-2015026068 A1 | * | 2/2015 | A41D 13/002 |
| WO | 2015/119037 A1 | | 8/2015 | |
| WO | WO-2018010355 A1 | * | 1/2018 | |
| WO | WO-2018010356 A1 | * | 1/2018 | |

(56) References Cited

FOREIGN PATENT DOCUMENTS

| WO | WO-2018010357 A1 * | 1/2018 | |
| WO | WO-2018067529 A1 * | 4/2018 | ........... B32B 27/322 |
| WO | WO-2020175702 A1 * | 9/2020 | |
| WO | 20200219275 A | 10/2020 | |

OTHER PUBLICATIONS

Machine Translation of CN-107524026-A, Dec. 2017 (Year: 2017).*

EVent fabrics, Protective membrane solutions provider eVent fabrics sets its sights on . . . , Apr. 2015, Innovation in Textiles, <https://www.innovationintextiles.com/protective-membrane-solutions-provider-event-fabrics-sets-its-sights-on-professional-market/> (Year: 2015).*

TestTexTextile, Hydrostatic Pressure Test Comparison: Resistance to Water Penetration of Textiles, Dec. 2021, Testex, <https://www.testextextile.com/hydrostatic-pressure-test-comparison-resistance-to-water-penetration-of-textiles/> (Year: 2021).*

Auerbach et al., Candidate Fabrics for the 2nd Generation Extended Cold Weather Clothing System, Feb. 1998, Army Soldier Systems Command in Natick, MA (Year: 1998).*

Machine Translation of WO-2004050973-A1, Jun. 2004 (Year: 2004).*

Machine Translation of JP-2007136970-A, Jun. 2007 (Year: 2007).*

Machine Translation of JP-2010030289-A, Feb. 2010 (Year: 2010).*

Machine Translation of JP-2013166340-A, Aug. 2013 (Year: 2013).*

Machine Translation of JP-2014100843-A, Jun. 2014 (Year: 2014).*

Gugel; "All About Waterproof Fabrics"; XP002801458; dated Jun. 4, 2017; 23 pages; retrieved on Dec. 11, 2020, from https://www.paddypallin.com.au/blog/all-about-waterproof-fabrics/.

International Search Report and Written Opinion dated Dec. 23, 2020 for PCT Application No. PCT/US2020/050367; 16 pages.

Office Action received for Korean Patent Application No. 10-2022-7012245, mailed on Jan. 22, 2024, 10 pages (4 pages of English Translation and 6 pages of Original Document).

Office Action received for Chinese Patent Application No. 202080072305.7, mailed on Apr. 12, 2024, 17 pages (11 pages of English Translation and 6 pages of Original Document).

Office Action received for Chinese Patent Application No. 202080072305.7, mailed on Dec. 14, 2023, 11 pages (6 pages of English Translation and 5 pages of Original Document).

Office Action received for Japanese Patent Application No. 2022-516152, mailed on Jun. 24, 2024, 6 pages (3 pages of English Translation and 3 pages of Original Document).

* cited by examiner

COMPOSITE MATERIALS WITH MEMBRANE

CROSS-REFERENCE TO RELATED APPLICATIONS

This application is a U.S. National Stage Application filed under 35 U.S.C. § 371(a) of International Patent Application Serial No. PCT/US2020/050367, filed Sep. 11, 2020, which claims the benefit of and priority to U.S. Provisional Application No. 62/900,001 filed Sep. 13, 2019, each of which are hereby incorporated by reference in its entirety.

BACKGROUND

Some items, such as snow pants, footwear, tents, etc., may be useful for keeping users comfortable. Keeping users comfortable may comprise keeping users dry from rain, hail, snow, etc. Making items out of material that is sufficiently water-resistant may keep users dry. Keeping users comfortable may comprise allowing hot air to escape so that users may remain cool. Making items out of material that is sufficiently breathable may allow hot air to escape. Improvements are needed.

SUMMARY

Composite materials are described herein. An example composite material may comprise a shell fiber layer. The example composite material may comprise a membrane disposed adjacent the shell fiber layer. The example composite material may exhibit a low range hydrostatic water resistance of above 5000 millimeter (mm) as measured using American Association of Textile Chemists and Colorists (AATCC) 127. The example composite material may exhibit an air permeability of above 0.25 cubic feet per minute (cfm) as measured using American Society for Testing and Materials (ASTM) D737. The example composite material may exhibit a moisture vapor transmission rate (MVTR) of above 30 kilogram per square meter per 24 hour (kg/sqm/24 hr) as measured using Japanese Industry Standards (JIS) L1099-B1.

Composite materials are described herein. An example composite material may comprise a shell fiber layer. The example composite material may comprise a membrane disposed adjacent the shell fiber layer. The example composite material may exhibit a low range hydrostatic water resistance of between 5000 millimeter (mm) and 25,000 mm as measured using American Association of Textile Chemists and Colorists (AATCC) 127. The example composite material may exhibit an air permeability of between 0.25 and 1 cubic feet per minute (cfm) as measured using American Society for Testing and Materials (ASTM) D737. The example composite material may exhibit a moisture vapor transmission rate (MVTR) of between 30 kilogram per square meter per 24 hour (kg/sqm/24 hr) and 60 Kg/sqm/24 hr as measured using Japanese Industry Standards (JIS) L1099-B1.

Composite materials are described herein. An example composite material may comprise a shell fiber layer. The example composite material may comprise a membrane disposed adjacent the shell fiber layer. The example composite material may exhibit a low range hydrostatic water resistance of between 5000 millimeter (mm) and 25,000 mm as measured using American Association of Textile Chemists and Colorists (AATCC) 127. The example composite material may exhibit an air permeability of between 0.25 and 1 cubic feet per minute (cfm) as measured using American Society for Testing and Materials (ASTM) D737. The example composite material may exhibit a moisture vapor transmission rate (MVTR) of between 30 kilogram per square meter per 24 hour (kg/sqm/24 hr) and 55 Kg/sqm/24 hr as measured using Japanese Industry Standards (JIS) L1099-B1.

Composite materials are described herein. An example composite material may comprise a shell fiber layer. The example composite material may comprise a membrane disposed adjacent the shell fiber layer. The example composite material may exhibit a low range hydrostatic water resistance of between 5000 millimeter (mm) and 25,000 mm as measured using American Association of Textile Chemists and Colorists (AATCC) 127. The example composite material may exhibit an air permeability of between 0.75 and 1 cubic feet per minute (cfm) as measured using American Society for Testing and Materials (ASTM) D737.

Articles are described herein. An example article may comprise composite material described herein. The example article may comprise a garment, gloves, footwear, headwear, bib pants, pants, a jacket, a tent, a sleeping bag, and a backpack. Other articles may be used.

DETAILED DESCRIPTION

Composite materials are described herein. The composite materials may be or comprise laminate materials having a plurality of layers. An example composite material may comprise a shell and a membrane. The shell may comprise a shell fiber layer. The shell may comprise various materials such as polymers. The shell may comprise polyester, nylon, recycled polyester, elastane, or combinations thereof. Other materials may be used. The membrane may be or comprise a breathable membrane. The membrane may be or comprise a water proof or water repellant membrane. The membrane may be formed from various process such as fiber spinning (e.g., electrospinning). Together, the shell and membrane may have a fabric weight. Various combinations of shell and membrane weight may be used. The membrane may have a weight of less than 9 gsm, less than 8 gsm, less than 7 gsm, less than 6 gsm, less than 5 gsm, less than 4 gsm, or less than 3 gsm. Other weight membranes may be used. The shell and the membrane may be disposed adjacent each other and may be coupled together, for example using adhesive.

The composites of the present disclosure show improved performance over comparative conventional materials. As shown more clearly in Tables 1-3, the composite materials of the present disclosure are identified using ID's: LV6W, LV6Z, LV74, LWEN, LV71, LWEQ, LV75, LWEP, LV7B, LV7D, and LWEO. The comparative examples are identified as A-L. The Appendix, which is hereby incorporate herein by reference in its entirety shows improved performance of the composite materials after 20 launderings.

Table 1 matches "High", "Medium", and "Low" labels for example value ranges for various measurements:

| KEY | Low Range Hydrostatic (AATCC 127) - As Received | Air Permeability (ASTM D737) - As Received | MVTR (JIS L1099-B1) |
|---|---|---|---|
| High | 10,000 mm+ | .75 cfm+ | 45K g/sqm/24 hr+ |
| Medium | 5,000-10,000 mm | .25-.75 cfm | 30K-45K g/sqm/24 hr |

| KEY | Low Range Hydrostatic (AATCC 127) - As Received | Air Permeability (ASTM D737) - As Received | MVTR (JIS L1099-B1) |
|---|---|---|---|
| Low | 0-5,000 mm | 0-0.25 cfm | 0-30K g/sqm/24 hr |

Table 2 shows attributes of various jackets:

| ID | Shell Fiber Content | Fabric Weight |
|---|---|---|
| A | 72% Polyester, 28% Nylon | 132 gsm |
| B | 100% Nylon | 82 gsm |
| C | 100% Nylon | 182 gsm |
| D | 100% Nylon with 100% Polyester Backer | 84 gsm |
| E | 100% Nylon | 83 gsm |
| F | 100% Recycled Polyester | Body: 150 gsm; Hood: 153 gsm |
| G | 100% Nylon | Body: 105 gsm; Hood: 115 gsm |
| H | 100% Nylon | 161 gsm |
| I | 100% Nylon | 120 gsm |
| J | 100% Nylon | 54 gsm |
| K | 100% Nylon | 64 gsm |
| L | 100% Recycled Polyester | 114 gsm |
| LV6W | 58% Nylon, 37% Polyester, 5% Elastane | 102 gsm |
| LV6Z | 100% Polyester | 177 gsm |
| LV74 | 100% Polyester | 173 gsm |
| LAVEN | 93% Nylon, 7% Elastane | 160 gsm |
| LV71 | 100% Polyester | 91 gsm |
| LWEQ | 93% Nylon, 7% Elastane | 168 gsm |
| LV75 | 62% Nylon, 33% Polyester, 5% Elastane | 136 gsm |
| LWEP | 93% Nylon, 7% Elastane | 158 gsm |
| LV7B | 75% Polyester, 25% Nylon | 163 gsm |
| LV7D | 75% Polyester, 25% Nylon | 165 gsm |
| LWEO | 96% Nylon, 4% Elastane | 164 gsm |

Table 3 shows attributes of various articles:

| ID | Shell Fiber Content | Fabric Weight |
|---|---|---|
| LMTU | 100% Polyester | 118 |
| LNWU | 82% Nylon, 14% Polyester, 4% Elastane | 230 |
| LUS0 | 100% Polyester | 62 |
| LV6W | 58% Nylon, 37% Polyester, 5% Elastane | 102 |
| LV71 | 100% Polyester | 91 |
| LVAZ | 91% Polyester, 9% Elastane | 207 |
| LVB0 | 93% Polyester, 7% Elastane | 237 |
| LVB1 | 100% Nylon | 53 |
| LVRX | 100% Nylon | 83 |
| LWEN | 93% Nylon, 7% Elastane | 160 |
| LWEO | 96% Nylon, 4% Elastane | 164 |
| LWEP | 93% Nylon, 7% Elastane | 158 |
| LWEQ | 93% Polyester, 7% Elastane | 168 |
| LWQY | 77% Polyester, 23% Nylon | 124 |
| LWQZ | 72% Nylon, 28% Polyester | 115 |
| LYMC | 100% Nylon | 218 |
| LYMD | 100% Nylon | 177 |
| LYMG | 69% Polyester, 31% Nylon | 102 |
| LYMP | 100% Nylon | 99 |
| LYON | 100% Polyester | 112 |
| LZ6I | 100% Nylon | 108 |
| LMTU | 100% Polyester | 118 |
| LUS0 | 100% Polyester | 62 |
| LV6W | 58% Nylon, 37% Polyester, 5% Elastane | 102 |
| LV6Z | 100% Polyester | 177 |
| LV71 | 100% Polyester | 91 |
| LV73 | 100% Polyester | 100 |
| LV74 | 100% Polyester | 173 |
| LV92 | 100% Polyester | 155 |
| LVAZ | 91% Polyester, 9% Elastane | 207 |
| LVB0 | 93% Polyester, 7% Elastane | 237 |
| LVB1 | 100% Nylon | 53 |
| LVRX | 100% Nylon | 83 |
| LVZ2 | 64% Polyester, 27% Wool, 9% Nylon | 332 |
| LWEN | 93% Nylon, 7% Elastane | 160 |
| LWEO | 96% Nylon, 4% Elastane | 164 |
| LWEP | 93% Nylon, 7% Elastane | 158 |
| LWEQ | 93% Polyester, 7% Elastane | 168 |
| LWQY | 77% Polyester, 23% Nylon | 124 |
| LWQZ | 72% Nylon, 28% Polyester | 115 |
| LXO2 | 100% Polyester | 160 |
| LXVP | 100% Polyester | 186 |
| LXVX | 100% Nylon | 246 |
| LY15 | 100% Polyester | 108 |
| LYMC | 100% Nylon | 218 |
| LYMD | 100% Nylon | 177 |
| LYOM | 100% Nylon | 153 |
| LYON | 100% Polyester | 112 |
| LYOP | 89% Polyester, 11% Elastane | 157 |
| LYOQ | 100% Polyester | 198 |
| LYOR | 51% Polyester, 49% Nylon | 140 |
| LYOT | 100% Polyester | 110 |
| LYOU | 100% Nylon | 135 |
| LYOV | 100% Nylon | 95 |
| LYOV | 100% Nylon | 95 |
| LYOW | 100% Nylon | 154 |
| LZIM | 91% Polyester, 9% Elastane | 178 |
| M1T5 | 97% Polyester, 3% Elastane | 218 |
| LV6Z | 100% Polyester | 177 |
| LVRX | 100% Nylon | 83 |
| LYMC | 100% Nylon | 218 |
| LYON | 100% Polyester | 112 |
| LZ6I | 100% Nylon | 108 |
| LV92 | 100% Polyester | 155 |
| LWQY | 77% Polyester, 23% Nylon | 124 |
| LWQZ | 72% Nylon, 28% Polyester | 115 |
| M4IP | 100% Polyester | 98 |
| M4RW | 79% Polyester, 21% Nylon | 158 |
| LYMC | 100% Nylon | 218 |
| LYON | 100% Polyester | 112 |
| LYOU | 100% Nylon | 135 |
| LYOW | 100% Nylon | 154 |
| M1T5 | 97% Polyester, 3% Elastane | 218 |
| M4IM | 100% Nylon | 106 |
| M4RX | 100% Nylon | 116 |
| M4SY | 100% Nylon | 254 |
| M4TF | 63% Polyester, 29% Nylon, 8% Polyethylene | 136 |
| M4TG | 72% Polyester, 21% Nylon, 7% Polyethylene | 142 |
| M4TI | 75% Polyester, 25% Nylon | 121 |
| M4TJ | 100% Polyester | 177 |
| M4W0 | 100% Polyester | 161 |
| M52J | 94% Polyester, 6% Polyethylene | 175 |
| M59R | 68% Polyester, 32% Nylon | 94 |
| M5KD | 100% Polyester | 163 |
| M5LR | 100% Polyester | 110 |
| M6A0 | 100% Polyester | 128 |

-continued

| ID | Shell Fiber Content | Fabric Weight |
|---|---|---|
| M6JU | 90% Nylon, 10% Polyethylene | 74 |
| M6JW | 72% Polyester, 21% Nylon, 7% Polyethylene | 142 |

Table 4 matches labels shows in Table 1 with jackets identified in Table 2.

| ID | Low Range Hydrostatic (AATCC 127) - As Received | Air Permeability (ASTM D737) - As Received | MVTR (JIS L1099-B1) |
|---|---|---|---|
| A | High | Medium | Low |
| B | Low | Medium | High |
| C | High | Low | Low |
| D | Low | High | Medium |
| E | Medium | Low | Low |
| F | High | Low | Medium |
| G | High | Low | High |
| H | High | Low | Low |
| I | High | Low | Medium |
| J | Medium | Low | Medium |
| K | Low | Low | Low |
| L | High | Low | Low |
| LV6W | Medium | Medium | Medium |
| LV6Z | High | Medium | Medium |
| LV74 | High | Medium | Medium |
| LWEN | Medium | Medium | Low |
| LV71 | Medium | High | High |
| LWEQ | Medium | Medium | Medium |
| LV75 | Medium | Medium | Medium |
| LWEP | Medium | Medium | Low |
| LV7B | High | Medium | Medium |
| LV7D | Medium | Medium | Medium |
| LWEO | Medium | High | Low |

Table 5 matches labels shows in Table 1 with articles identified in Table 3.

| ID | Low Range Hydrostatic (AATCC 127) - As Received | Air Permeability (ASTM D737) - As Received | MVTR (JIS L1099-B1) |
|---|---|---|---|
| LMTU | High | Medium | Medium |
| LNWU | High | Medium | Low |
| LUS0 | Low | Medium | High |
| LV6W | Medium | Medium | Medium |
| LV71 | Medium | High | High |
| LVAZ | High | Medium | Low |
| LVB0 | High | Medium | Low |
| LVB1 | Low | High | High |
| LVRX | Medium | Low | Low |
| LWEN | Medium | Medium | Low |
| LWEO | Medium | High | Low |
| LWEP | Medium | Medium | Low |
| LWEQ | Medium | Medium | Medium |
| LWQY | High | Medium | Medium |
| LWQZ | Medium | Medium | Medium |
| LYMC | Medium | Medium | Low |
| LYMD | Low | High | Low |
| LYMG | Medium | Medium | Medium |
| LYMP | Medium | Medium | Medium |
| LYON | Medium | High | High |
| LZ6I | Medium | Medium | Low |
| LMTU | High | Medium | Medium |
| LUS0 | Low | Medium | High |
| LV6W | Medium | Medium | Medium |
| LV6Z | High | Medium | Medium |
| LV71 | Medium | High | High |
| LV73 | Medium | Medium | High |
| LV74 | High | Medium | Medium |
| LV92 | High | Medium | High |
| LVAZ | High | Medium | Low |
| LVB0 | High | Medium | Low |
| LVB1 | Low | High | High |
| LVRX | Medium | Low | Low |
| LVZ2 | Low | Medium | Low |
| LWEN | Medium | Medium | Low |
| LWEO | Medium | High | Low |
| LWEP | Medium | Medium | Low |
| LWEQ | Medium | Medium | Medium |
| LWQY | High | Medium | Medium |
| LWQZ | Medium | Medium | Medium |
| LXO2 | High | Medium | Medium |
| LXVP | High | Medium | Medium |
| LXVX | Medium | Medium | Low |
| LY15 | High | Medium | High |
| LYMC | Medium | Medium | Low |
| LYMD | Low | High | Low |
| LYOM | Medium | Medium | Low |
| LYON | Medium | High | High |
| LYOP | Medium | Medium | Medium |
| LYOQ | High | High | High |
| LYOR | Medium | Medium | Medium |
| LYOT | Medium | High | High |
| LYOU | Medium | Medium | Low |
| LYOV | Medium | Medium | High |
| LYOV | Medium | Medium | High |
| LYOW | Medium | Medium | Low |
| LZIM | Medium | Medium | Low |
| M1T5 | High | High | Low |
| LV6Z | High | Medium | Medium |
| LVRX | Medium | Low | Low |
| LYMC | Medium | Medium | Low |
| LYON | Medium | High | High |
| LZ6I | Medium | Medium | Low |
| LV92 | High | Medium | High |
| LWQY | High | Medium | Medium |
| LWQZ | Medium | Medium | Medium |
| M4IP | High | Medium | Medium |
| M4RW | High | Medium | Low |
| LYMC | Medium | Medium | Low |
| LYON | Medium | High | High |
| LYOU | Medium | Medium | Low |
| LYOW | Medium | Medium | Low |
| M1T5 | High | High | Low |
| M4IM | Medium | Medium | Medium |
| M4RX | High | Medium | Medium |
| M4SY | High | Medium | Low |
| M4TF | High | Medium | Low |
| M4TG | Medium | Medium | Low |
| M4TI | High | Medium | Low |
| M4TJ | High | Medium | Low |
| M4WO | High | Medium | Low |
| M52J | High | Medium | Low |
| M59R | Medium | Medium | Medium |
| M5KD | High | Medium | Medium |
| M5LR | Medium | Medium | Low |
| M6AO | Medium | Medium | Medium |
| M6JU | Low | Medium | Medium |
| M6JW | Medium | Medium | Low |

Composite materials are described herein. An example composite material may comprise a shell fiber layer. The shell fiber layer may comprise one or more of nylon, polyester, or elastane. The shell fiber layer may consist essentially of one or more of nylon, polyester, or elastane. The shell fiber layer may comprise about 100 weight percent (wt %) polyester from a total of 100 wt % of the shell fiber layer. The shell fiber layer may comprise greater than 90 wt % polyester from a total of 100 wt %. The shell fiber layer may comprise about 90 wt %, 91 wt %, 92 wt %, 93 wt %, 94 wt %, 95 wt %, 96 wt %, 97 wt %, 98 wt %, 99 wt %.

Other loadings may be used. The shell fiber layer may comprise about 58 wt % nylon, about 37 wt % polyester, and about 5 wt % elastane. The shell fiber layer may comprise about 93 wt % nylon and about 7 wt % elastane. The shell fiber layer may comprise between 50 wt % and 100 wt % nylon. The shell fiber layer may comprise nylon by weight percent wt % as 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt %, 99 wt % based on 100 wt % of the composite material. Other loadings may be used. The shell fiber layer may comprise about 62 wt % nylon, about 33 wt % polyester, and about 5 wt % elastane. The shell fiber layer may comprise about 93 wt % nylon and about 7 wt % elastane. The shell fiber layer may comprise about 75 wt % polyester and about 25 wt % nylon. The shell fiber layer may comprise 96% nylon, 4% elastane.

The example composite material may comprise a membrane disposed adjacent the shell fiber layer. The membrane may be coupled to the shell fiber layer. The membrane may be glued to the shell fiber layer.

Composite materials are described herein. An example composite material may comprise a shell fiber layer. The example composite material may comprise a membrane disposed adjacent the shell fiber layer. The example composite material may exhibit a low range hydrostatic water resistance of above 5000 millimeter (mm) as measured using American Association of Textile Chemists and Colorists (AATCC) 127. The example composite material may exhibit an air permeability of above 0.25 as measured using American Society for Testing and Materials (ASTM) D737. The example composite material may exhibit a moisture vapor transmission rate (MVTR) of above 30 kilogram per square meter per 24 hour (kg/sqm/24 hr) as measured using Japanese Industry Standards (JIS) L1099-B1.

The example composite material may exhibit a low range hydrostatic water resistance of between 5000 millimeter (mm) and 25,000 mm as measured using American Association of Textile Chemists and Colorists (AATCC) 127. The example composite material may exhibit an air permeability of between 0.25 and 1 cubic feet per minute (cfm) as measured using American Society for Testing and Materials (ASTM) D737. The example composite material may exhibit a moisture vapor transmission rate (MVTR) of between 30 kilogram per square meter per 24 hour (kg/sqm/24 hr) and 55 Kg/sqm/24 hr as measured using Japanese Industry Standards (JIS) L1099-B1.

A fabric weight associated with the example composite material may be between 90 grams per square meter (gsm) and 200 gsm. A fabric weight associated with the example composite material may be between 90 gsm and 180 gsm. A fabric weight associated with the example composite material may be between 91 gsm and 177 gsm. Other fabric weights and component weights may be used.

The example composite material may exhibit a low range hydrostatic water resistance of between 5000 millimeter (mm) and 25,000 mm as measured using American Association of Textile Chemists and Colorists (AATCC) 127. The example composite material may exhibit an air permeability of between 0.75 and 1 cubic feet per minute (cfm) as measured using American Society for Testing and Materials (ASTM) D737.

A fabric weight associated with the example composite material may be between 90 grams per square meter (gsm) and 200 gsm. A fabric weight associated with the example composite material may be between 90 gsm and 180 gsm. A fabric weight associated with the example composite material may be between 91 gsm and 177 gsm.

Articles are described herein. An example article may comprise composite material described herein. The example article may comprise a garment, gloves, footwear, headwear, bib pants, pants, a jacket, a tent, a sleeping bag, and a backpack.

| ID | Fabric Weight | Water Repellency (AATCC 22) - As Received | Water Repellency (AATCC 22) - After 20 Launderings | Low Range Hydrostatic (AATCC 127) - As Received | Low Range Hydrostatic (AATCC 127) - After 20 Launderings | High Range Hydrostatic (ASTM D751) - As Received |
|---|---|---|---|---|---|---|
| A | 132 gsm | 90 Points | 80 Points | 11178 mm | 8083 mm | 39.8 psi |
| B | 82 gsm | 90 Points | 90 Points | 1656 mm | 372 mm | 22.8 psi |
| C | 182 gsm | 90 Points | 70 Points | 17944 mm | 11903 mm | 75.4 psi |
| D | 84 gsm | 90 Points | 80 Points | 4303 mm | 2310 mm | 24.7 psi |
| E | 83 gsm | 90 Points | 80 Points | 6531 mm | 6483 mm | 25.9 psi |
| F | Body: 150 gsm; Hood: 153 gsm | 90 Points | 80 Points | Body: >20000 mm; Hood: 13716 mm | 15397 mm | Body: 98.4 psi; Hood: 105.5 psi |
| G | Body: 105 gsm; Hood: 115 gsm | 90 Points | 80 Points | Body: 10554 mm; Hood: 10393 mm | 7854 mm | Body: 66.8 psi; Hood: 53.8 psi |
| H | 161 gsm | 100 Points | 80 Points | >20000 mm | >20000 mm | 132 psi |
| I | 120 gsm | 100 Points | 80 Points | >20000 mm | 10000 mm | 107 psi |
| J | 54 gsm | 100 Points | 80 Points | 8374 mm | 2958 mm | 59 psi |
| K | 64 gsm | 90 Points | 80 Points | 2158 mm | 1173 mm | 24 psi |
| L | 114 gsm | 100 Points | 90 Points | >20000 mm | >20000 mm | 139 psi |
| LV6W | 102 gsm | 90 Points | 80 Points | 9823 mm | 4554 mm | 34 psi |
| LV6Z | 177 gsm | 100 Points | 90 Points | 13286 mm | 4345 mm | 43 psi |
| LV74 | 173 gsm | 90 Points | 90 Points | 11822 mm | 5086 mm | 34 psi |
| LWEN | 160 gsm | 90 Points | 90 Points | 6768 mm | 3322 mm | 29 psi |
| LV71 | 91 gsm | 100 Points | 80 Points | 9557 mm | 2621 mm | 35 psi |
| LWEQ | 168 gsm | 100 Points | 80 Points | 8991 mm | 2978 mm | 40 psi |
| LV75 | 136 gsm | 100 Points | 100 Points | 5508 mm | 4182 mm | 38 psi |

-continued

| ID | | | | | |
|---|---|---|---|---|---|
| LWEP | 158 gsm | 90 Points | 90 Points | 7186 mm | 2234 mm | 35 psi |
| LV7B | 163 gsm | 90 Points | 70 Points | 13357 mm | 3223 mm | 42 psi |
| LV7D | 165 gsm | 90 Points | 70 Points | 9767 mm | 3325 mm | 37 psi |
| LWEO | 164 gsm | 100 Points | 80 Points | 9399 mm | 4060 mm | 30 psi |

| ID | High Range Hydrostatic (ASTM D751) - After 20 Launderings | Air Permeability (ASTM D737) - As Received | MVTR (ASTM E96B 19 mm air gap) | MVTR (JIS L1099-B1) | Liquid Integrity Test (ASTM F1359M - 16a; Modified) |
|---|---|---|---|---|---|
| A | 40 psi | 0.314 cfm | 866 g/sqm/24 hr | 28687 g/sqm/24 hr | FAIL |
| B | 5 psi | 0.696 cfm | 883 g/sqm/24 hr | 47552 g/sqm/24 hr | PASS |
| C | 45 psi | 0.151 cfm | 631 g/sqm/24 hr | 20398 g/sqm/24 hr | FAIL |
| D | 25 psi | 0.966 cfm | 967 g/sqm/24 hr | 34598 g/sqm/24 hr | PASS |
| E | 50 psi | 0.1 cfm | 685 g/sqm/24 hr | 22698 g/sqm/24 hr | FAIL |
| F | 90 psi | Body: <0.1 cfm; Hood: 0.10 cfm | Body: 763 g/sqm/24 hr; Hood: 686 g/sqm/24 hr | Body: 37515 g/sqm/24 hr; Hood: 34339 g/sqm/24 hr | FAIL |
| G | 44 psi | Body: 0.11 cfm; Hood: 0.12 cfm | Body: 859 g/sqm/24 hr; Hood: 835 g/sqm/24 hr | Body: 58270 g/sqm/24 hr; Hood: 51274 g/sqm/24 hr | PASS |
| H | 113 psi | <0.1 cfm | 845 g/sqm/24 hr | 20658 g/sqm/24 hr | PASS |
| I | 113 psi | 0.12 cfm | 848 g/sqm/24 hr | 37847 g/sqm/24 hr | PASS |
| J | 60 psi | <0.1 cfm | 733 g/sqm/24 hr | 42758 g/sqm/24 hr | PASS |
| K | 15 psi | <0.1 cfm | 652 g/sqm/24 hr | 6548 g/sqm/24 hr | PASS |
| L | 133 psi | 0.15 cfm | 639 g/sqm/24 hr | 20008 g/sqm/24 hr | FAIL |
| LV6W | 28 psi | 0.60 cfm | 1150 g/sqm/24 hr | 41926 g/sqm/24 hr | PASS |
| LV6Z | 29 psi | 0.59 cfm | 801 g/sqm/24 hr | 34910 g/sqm/24 hr | PASS |
| LV74 | 28 psi | 0.42 cfm | 909 g/sqm/24 hr | 40016 g/sqm/24 hr | PASS |
| LWEN | 25 psi | 0.73 cfm | 903 g/sqm/24 hr | 23022 g/sqm/24 hr | PASS |
| LV71 | 25 psi | 0.84 cfm | 1129 g/sqm/24 hr | 59842 g/sqm/24 hr | PASS |
| LWEQ | 29 psi | 0.72 cfm | 921 g/sqm/24 hr | 30649 g/sqm/24 hr | PASS |
| LV75 | 31 psi | 0.48 cfm | 863 g/sqm/24 hr | 31974 g/sqm/24 hr | PASS |
| LWEP | 23 psi | 0.70 cfm | 890 g/sqm/24 hr | 26089 g/sqm/24 hr | PASS |
| LV7B | 39 psi | 0.52 cfm | 920 g/sqm/24 hr | 34767 g/sqm/24 hr | PASS |
| LV7D | 36 psi | 0.58 cfm | 801 g/sqm/24 hr | 37950 g/sqm/24 hr | PASS |
| LWEO | 30 psi | 0.90 cfm | 944 g/sqm/24 hr | 27544 g/sqm/24 hr | PASS |

What is claimed is:

1. A launderable composite fabric material comprising:
a shell fiber layer comprising nylon at about 58 wt %, polyester, and elastane; and
a spun fiber membrane coupled to the shell fiber layer;
wherein the composite fabric material exhibits a low range hydrostatic water resistance of between 5,000 millimeters (mm) and 10,000 mm as measured using American Association of Textile Chemists and Colorists (AATCC) 127;
wherein the composite fabric material exhibits an air permeability of between 0.25 cubic feet per minute (cfm) and 0.75 cfm as measured using American Society for Testing and Materials (ASTM) D737;
wherein the composite fabric material exhibits a moisture vapor transmission rate (MVTR) of between 30 kilogram per square meter per 24 hour (kg/sqm/24 hr) and 45 kg/sqm/24 hr as measured using Japanese Industry Standards (JIS) L1099-B1; and
wherein an overall fabric weight of the composite fabric material is about 102 grams per square meter (gsm).

2. The composite fabric material of claim 1, wherein the shell fiber layer comprises the polyester at about 37 wt % and the elastane at about 5 wt %.

3. The composite fabric material of claim 2, wherein the shell fiber consists essentially of the nylon, the polyester, and the elastane.

4. The composite fabric material of claim 1, wherein the spun fiber membrane is an electrospun fiber membrane.

5. The composite fabric material of claim 1, wherein the spun fiber membrane has a weight less than 9 gsm.

6. The composite fabric material of claim 1, wherein the spun fiber membrane is coupled to the shell fiber layer by adhesive.

7. The composite fabric material of claim 1, wherein the low range hydrostatic water resistance is about 9,823 mm, the air permeability is about 0.6 cfm, and the MVTR is about 41.926 kg/sqm/24 hr.

8. The composite fabric material of claim 7, wherein the composite fabric material exhibits a water repellency of about 90 points as measured using AATCC 22 and a high range hydrostatic of about 34 psi as measured by using ASTM D751, and
    after 20 launderings, the composite fabric material exhibits a water repellency of about 80 points, a low range hydrostatic of about 4,554 mm, and a high range hydrostatic of about 28 psi.

9. An article comprising the composite fabric material of claim 1, wherein the article comprises a garment, gloves, footwear, headwear, bib pants, pants, jacket, a tent, a sleeping bag, and a backpack.

10. A jacket comprising the composite fabric material of claim 1.

11. A launderable composite fabric material comprising:
    a shell fiber layer comprising nylon at about 62 wt %, polyester, and elastane; and
    a spun fiber membrane coupled to the shell fiber layer;
    wherein the composite fabric material exhibits a low range hydrostatic water resistance of between 5,000 millimeters (mm) and 10,000 mm as measured using American Association of Textile Chemists and Colorists (AATCC) 127;
    wherein the composite fabric material exhibits an air permeability of between 0.25 cubic feet per minute (cfm) and 0.75 cfm as measured using American Society for Testing and Materials (ASTM) D737;
    wherein the composite fabric material exhibits a moisture vapor transmission rate (MVTR) of between 30 kilogram per square meter per 24 hour (kg/sqm/24 hr) and 45 kg/sqm/24 hr as measured using Japanese Industry Standards (JIS) L1099-B1; and
    wherein an overall fabric weight of the composite fabric material is about 136 grams per square meter (gsm).

12. The composite fabric material of claim 11, wherein the shell fiber layer comprises the polyester at about 33 wt % and the elastane at about 5 wt %.

13. The composite fabric material of claim 12, wherein the shell fiber layer consists essentially of the nylon, the polyester, and the elastane.

14. The composite fabric material of claim 11, wherein the spun fiber membrane is an electrospun fiber membrane.

15. The composite fabric material of claim 11, wherein the spun fiber membrane has a weight of less than 9 gsm.

16. The composite fabric material of claim 11, wherein the spun fiber membrane is coupled to the shell fiber layer by adhesive.

17. The composite fabric material of claim 11, wherein the low range hydrostatic water resistance is about 5,508 mm, the air permeability is about 0.48 cfm, and the MVTR is about 31.974 kg/sqm/24 hr.

18. The composite fabric material of claim 17, wherein the composite fabric material exhibits a water repellency of about 100 points as measured using AATCC 22 and a high range hydrostatic of about 38 psi as measured by using ASTM D751, and
    after 20 launderings, the composite fabric material exhibits a water repellency of about 100 points, a low range hydrostatic of about 4, 182 mm, and a high range hydrostatic of about 31 psi.

19. An article comprising the composite fabric material of claim 11, wherein the article comprises a garment, gloves, footwear, headwear, bib pants, pants, jacket, a tent, a sleeping bag, and a backpack.

20. A jacket comprising the composite fabric material of claim 11.

\* \* \* \* \*